United States Patent
Striem-Amit

(10) Patent No.: US 10,284,366 B2
(45) Date of Patent: May 7, 2019

(54) MOBILE COMMUNICATION SYSTEM IMPLEMENTING INTEGRATION OF MULTIPLE LOGINS OF MOBILE DEVICE APPLICATIONS

(71) Applicant: ELTA SYSTEMS LTD., Ashdod (IL)

(72) Inventor: Yonathan Striem-Amit, Gedera (IL)

(73) Assignee: ELTA SYSTEMS LTD., Ashdod (IL)

( * ) Notice: Subject to any disclaimer, the term of this patent is extended or adjusted under 35 U.S.C. 154(b) by 709 days.

(21) Appl. No.: 14/347,663

(22) PCT Filed: Sep. 27, 2012

(86) PCT No.: PCT/IL2012/050394
§ 371 (c)(1),
(2) Date: Mar. 27, 2014

(87) PCT Pub. No.: WO2013/065037
PCT Pub. Date: May 10, 2013

(65) Prior Publication Data
US 2014/0237248 A1 Aug. 21, 2014

(30) Foreign Application Priority Data
Sep. 27, 2011 (IL) .......................................... 215424

(51) Int. Cl.
*H04L 9/08* (2006.01)
*A63G 31/16* (2006.01)
(Continued)

(52) U.S. Cl.
CPC ............ *H04L 9/0844* (2013.01); *A63G 31/16* (2013.01); *B66B 3/008* (2013.01); *G06F 21/32* (2013.01);
(Continued)

(58) Field of Classification Search
None
See application file for complete search history.

(56) References Cited

U.S. PATENT DOCUMENTS 5,684,950 A * 11/1997 Dare ....................... G06F 21/41
726/10
2003/0163733 A1 8/2003 Barriga-Caceres et al.
(Continued)

OTHER PUBLICATIONS

Authentication, Trusted Platform Module (TPM): The Next Authentication Token, https://web.archive.org/web/20110817133032/http://www.trustedcomputinggroup.org/solutions/authentication, Sep. 2011, pp. 1-2.
(Continued)

*Primary Examiner* — Esther B. Henderson
(74) *Attorney, Agent, or Firm* — Browdy and Neimark, PLLC

(57) ABSTRACT

In existing mobile implementations, there is a disconnect between the mobile device accessing the network and the applicative services inasmuch as the entity responsible for network access, such as the VPN Gateway, differs from the entity governing access to applications, such as email servers and SharePoint repositories. Therefore existing solutions typically employ two authentication methods. Of these, the first may be used to authenticate the mobile device to the VPN Gateway, while the second may be used to authenticate the mobile device towards the applications server. In order to facilitate strong authentication it is often desired to utilize a mechanism that uses or combines two different factors, e.g. "something you have" (such as but not limited to a smart card) and "something you know" (such as but not limited to a password). Most currently available mobile devices offer limited options to connect external devices to them, render-
(Continued)

ing most "Something you have" solutions irrelevant. For instance, there is no ability to connect a smart-card to a mobile phone.

28 Claims, 5 Drawing Sheets

(51) Int. Cl.
    *B66B 3/00*     (2006.01)
    *G09F 19/22*     (2006.01)
    *G06F 21/32*     (2013.01)
    *H04L 9/00*     (2006.01)
    *B64D 11/00*     (2006.01)

(52) U.S. Cl.
    CPC .............. *G09F 19/22* (2013.01); *H04L 9/006* (2013.01); *B64D 2011/0061* (2013.01)

(56) References Cited

U.S. PATENT DOCUMENTS

| | | | |
|---|---|---|---|
| 2005/0044197 A1* | 2/2005 | Lai | G06Q 10/10 709/223 |
| 2005/0055555 A1* | 3/2005 | Rao | G06F 21/32 713/182 |
| 2005/0138362 A1 | 6/2005 | Kelly et al. | |
| 2005/0223217 A1 | 10/2005 | Howard et al. | |
| 2007/0274522 A1 | 11/2007 | Boman et al. | |
| 2008/0127320 A1 | 5/2008 | DeLutiis et al. | |
| 2008/0141356 A1 | 6/2008 | Giles et al. | |
| 2009/0125992 A1 | 5/2009 | Larsson et al. | |
| 2009/0328178 A1 | 12/2009 | McDaniel et al. | |
| 2010/0037046 A1 | 2/2010 | Ferg et al. | |
| 2010/0081417 A1 | 4/2010 | Hickie | |
| 2010/0138905 A1* | 6/2010 | Kass | G06F 21/33 726/7 |
| 2010/0161965 A1 | 6/2010 | Solin et al. | |
| 2012/0054625 A1* | 3/2012 | Pugh | G06F 21/41 715/736 |
| 2012/0151210 A1* | 6/2012 | Perez | G06F 21/35 713/168 |

OTHER PUBLICATIONS

Franks, et al., HTTP Authentication: Basic and Digest Access Authentication: Basic and Digest Access Authentication, http://tools.ietf.org/html/rfc2617, Jun. 1999, pp. 1-34.

Neuman, et al., The Kerberos Network Authentication Service (V5), http://www.ietf.org/rfc/rfc4120.txt, Jul. 2005, pp. 1-121.

\* cited by examiner

MOBILE COMMUNICATION SYSTEM IMPLEMENTING INTEGRATION OF MULTIPLE LOGINS OF MOBILE DEVICE APPLICATIONS

REFERENCE TO CO-PENDING APPLICATIONS

Priority is claimed from Israeli Patent Application No. 215424 entitled "A mobile communication system implementing integration of multiple logins of mobile device applications" and filed on Sep. 27, 2011.

FIELD OF THE INVENTION

The present invention relates generally to mobile communication devices and more particularly to software applications used at mobile telephones.

BACKGROUND OF THE INVENTION

It is often the case where organizations desire their employees or others to gain secured access to their corporate IT infrastructure. In such cases these organizations (e.g. corporate organizations, banks, etc.) often employ a VPN Gateway used by the authorized mobile devices to securely access the organizational network.

The disclosures of any publications and patent mentioned in the specification, and of the publications and patent documents cited therein directly or indirectly, are hereby incorporated by reference.

SUMMARY OF THE INVENTION

In existing mobile implementations, there is a disconnect between the mobile device accessing the network and the applicative services inasmuch as the entity responsible for network access, such as the VPN Gateway, differs from the entity governing access to applications, such as email servers and SharePoint repositories. Therefore existing solutions typically employ two authentication methods. Of these, the first may be used to authenticate the mobile device to the VPN Gateway, while the second may be used to authenticate the mobile device towards the applications server.

In order to facilitate strong authentication it is often desired to utilize a mechanism that uses or combines two different factors, e.g. "something you have" (such as but not limited to a smart card) and "something you know" (such as but not limited to a password). Most currently available mobile devices offer limited options to connect external devices to them, rendering most "Something you have" solutions irrelevant. For instance, there is no ability to connect a smart-card to a mobile phone. The end result is that most organizations choose to use a password only, forgoing the "Something you have" clause of authentication and opting to use a username/password pair only. This situation effectively prevents the usage of more complex authentication mechanisms such as those using smart-cards and/or PKI for secure, two-factor, authentication.

This creates an unfortunate situation whereby each application has to manage its own authentication scheme thereby complicating management of authentication for multiple applications.

Certain embodiments of the present invention seek to provide a device which incorporates a security processor (not shown) with a dedicated smart-card based on PKI (Public Key Infrastructure).

Certain embodiments of the present invention seek to provide a security processor (not shown) including software running on a main processor, for example utilizing a mechanism such as ARM'S TrustZone Technology.

Typically, the secure mobile device uses this PKI as a basis for network authentication which, as is well known, is superior e.g. in that PKI is less susceptible to guesses and to myriads of attacks on classical username/password based authentication.

Typically, the secure mobile device uses this PKI as a basis for network authentication which is compatible with the use of the smart-card authentication mechanism.

Certain embodiments of the present invention seek to provide a system for managing sign-on and applicative authentication that utilizes strong encryption available in a secure smart-phone.

Certain embodiments of the present invention seek to provide a central system that manages authentication for all applications in a manner that is easy to manage.

Certain embodiments of the present invention seek to provide a central system that manages authentication for all applications in a manner that is transparent to the user.

Also provided is a computer program product, comprising a typically non-transitory computer usable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The present invention typically includes at least the following embodiments:

Embodiment 1. A mobile communication system including:
multiple login integration apparatus for secure integration of multiple login systems in mobile communication device applications.

Embodiment 2. A system according to embodiment 1 wherein said apparatus incorporates a security processor with a dedicated smart-card based on PKI (Public Key Infrastructure) functionality.

Embodiment 3. A system according to embodiment 2 wherein at least one secure mobile device uses said PKI functionality as a basis for network authentication.

Embodiment 4. A system according to embodiment 3 wherein said network authentication is compatible with smart-card authentication.

Embodiment 5. A system according to embodiment 1 which also comprises apparatus for managing sign-on and applicative authentication that utilizes strong encryption available in a secure smart-phone.

Embodiment 6. A system according to embodiment 1 which is operative to manage authentication for a plurality of applications in a manner that is transparent to the user.

Embodiment 7. A system according to embodiment 1 wherein at least one of the mobile communication device applications use at least one of: username based authentication and password based authentication,
and wherein a central entity is used to translate said authentication to an applicative authentication.

Embodiment 8. A system according to embodiment 1 wherein PKI based authentication is employed and wherein a central entity is used to translate said authentication to an applicative authentication.

Embodiment 9. A system according to embodiment 1 wherein a server is provided which has "single-sign on" functionality in conjunction with mobile authentication functionality.

Embodiment 10. A system according to embodiment 9 wherein the server comprises a central server that defines logic of authentication of each application in the cellular network being served by the server.

Embodiment 11. A mobile communication method including:
multiple login integration including secure integration of multiple login systems in mobile communication device applications; the integration including:
accepting, from a mobile application, an indication of a corporate application to which it wants to login including receiving, at an Authentication Broker, from the mobile application, a request to perform login to the corporate application;
using the Authentication Broker to verify the user's credentials;
using the Authentication Broker to login to at least one of an Active Directory and an applicative authentication mechanism and sending an authentication token, accordingly, to the mobile communication device, wherein the token is usable by the mobile application to login to the network.

Embodiment 12. A method according to embodiment 11 wherein the individual mobile application is defined by a user of an individual mobile communication device.

Embodiment 13. A system according to embodiment 9 wherein the server includes Authentication Broker functionality including modules that control the authentication process for various applications.

Embodiment 14. A system according to embodiment 13 wherein authentication process control comprises modification or insertion of authentication records and/or enforcement of policies.

Embodiment 15. A system according to embodiment 1 wherein the apparatus includes a Credential Management subsystem which, during integration of the network platform, installs at least some of the following information: username and password, private and/or first public key for a user, a second public key from the mobile device.

Embodiment 16. A system according to embodiment 1 wherein modules that control the authentication process reside in a central server, and hence can be centrally managed.

Embodiment 17. A system according to embodiment 1 wherein a public key from a mobile communication device is used to protect a completely different key used to authenticate the mobile communication device to an application server.

Embodiment 18. A system according to embodiment 1 wherein, when a mobile communication device user performs a login, at least some of the following occur:
the mobile application sends a request to an Authentication Broker;
the public key of the mobile device signs the request;
the Authentication Broker validates the request and creates a new login request to a target authentication system.

Embodiment 19. A system according to embodiment 1 wherein user credentials are stored in the clear on a central server so that an Authentication Broker functionality can use the user credentials stored in the clear authenticate for purposes of another mobile application as well.

Embodiment 20. A system according to embodiment 1 wherein the authentication credentials are not stored in the clear, but rather are encrypted by the public key of an intended user of the credentials.

Embodiment 21. A system according to embodiment 20 wherein an authentication record is maintained including at least some of: the user name, user's password/private key, application and/or authentication service for which the record is intended.

Embodiment 22. A mobile communication method including:
multiple login integration including secure integration of multiple login systems in mobile communication device applications; the integration including:
accepting, from a mobile application, an indication of a corporate application to which it wants to login including receiving, at an Authentication Broker, from the mobile application, a request to perform login to the corporate application;
using the Authentication Broker to verify the user's credentials;

using the Authentication Broker to send an encrypted authentication record to the mobile device;

using software on the mobile device to send the encrypted record to a login service running on the mobile device in a secure manner; and providing the authentication token to the mobile application.

Embodiment 23. A method according to embodiment 22 which is repeated for each application/authentication service from among a plurality of such.

Embodiment 24. A method according to embodiment 11 which is repeated sequentially or in parallel for each application/authentication service from among a plurality of such.

Embodiment 25. A mobile application authentication method for authentication of applications serving any of a population of mobile devices interconnected by a communication network, the method comprising:

using a single network and/or user identity authentication process to allow authentication of a first application serving at least one individual mobile device from among the population of mobile devices; and re-using the same single network and/or user identity authentication process to allow authentication of at least one second application serving the at least one individual mobile device.

Embodiment 26. A method according to embodiment 25 wherein said network comprises a wireless network.

Embodiment 27. A method according to embodiment 26 wherein said network comprises a cellular network.

Embodiment 28. A mobile application authentication method comprising:

providing a centralistic authentication broker for central management of policy and/or configuration, including authentication aspects; and employing the broker for central management of policy and/or configuration, including authentication aspects, of multiple log-ins to multiple applications.

Embodiment 29. A mobile application authentication method comprising:

providing each of a plurality of applications with its own authentication server or mechanism;

using an integrated authentication server or mechanism in order to work vis a vis each of the said plurality of the authentication servers or mechanisms.

Embodiment 30. A method according to embodiment 29 wherein said integrated authentication server comprises an Active Directory.

Embodiment 31. A mobile application authentication method for authentication of applications serving any of a population of mobile devices interconnected by a communication network, the method comprising:

providing a broker operative for authentication of each of a plurality of application servers, wherein authentication of at least one individual application server is based on a preliminary session between the broker and at least one individual mobile device offering an individual mobile application provided by the individual application server;

receiving, at the broker, a certificate for the user of the individual mobile device who seeks to use the individual mobile application, which certificate is sent by the authentication entity of the individual application's application server; and sending the certificate from the broker to the individual mobile device, securely, based on said preliminary session.

Embodiment 32. A method according to embodiment 31 wherein said network comprises a wireless network.

Embodiment 33. A method according to embodiment 31 wherein said network comprises a cellular network.

Embodiment 34. A mobile application authentication method for authentication of applications serving any of a population of mobile devices interconnected by a communication network, the method comprising:

providing a broker that stores in its memory an authentication record e.g. password and user name, for each individual user of an individual application, for all users and for all applications used thereby.

Embodiment 35. A method according to any of embodiments 31 or 34 wherein a secured connection is generated between the mobile device and the broker which is secured by at least one of network- or user-authentication.

Embodiment 36. A method according to embodiment 35 wherein authentication includes:

the mobile device asks for an application from the broker over the secured connection;

the broker responds by sending back to the mobile device, over the secured connection, its own authentication record;

an application in the mobile device forwards the authentication record received from the broker, on to the application server.

Embodiment 37. A method according to any of embodiments 31-36 wherein information stored in the broker, is stored encrypted rather than in the clear and is subsequently sent as-is to the mobile device.

Embodiment 38. A computer program product, comprising a computer usable medium having a computer readable program code embodied therein, said computer readable program code adapted to be executed to implement any of the methods shown and described herein.

Embodiment 39. A method according each one of the preceding embodiments wherein said user identity authentication is based on biometric authentication mechanisms.

Embodiment 40. A method according to embodiment 39 wherein said biometric authentication mechanisms is based at least one of the following: voice recognition, fingerprint, face recognition, iris recognition.

Embodiment 41. A method according to any of embodiments 1-38 wherein said user identity authentication is based on manual user insertion of authentication record.

Embodiment 42. A method according to embodiment 41 wherein said authentication record is username and password.

Embodiment 43. A method according each one of the preceding embodiments wherein said user identity authentication is based on one or more of the proposed user identity authentication types such as biometric mechanisms and user insertion.

Embodiment 44. A communication system according to any of the preceding embodiment that includes authentication record encryption apparatus (device or software) used for encryption of the clear authentication record.

Embodiment 45. A communication system according to embodiment 44 wherein said authentication record encryption apparatus also is used to load said encrypted authentication records to the Authentication Broker.

Embodiment 46. A method according to any of the preceding embodiments wherein said encrypted authentication record are created by authentication record encryption apparatus and loaded from the authentication record encryption apparatus to the Authentication Broker.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any time of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Figure 1:
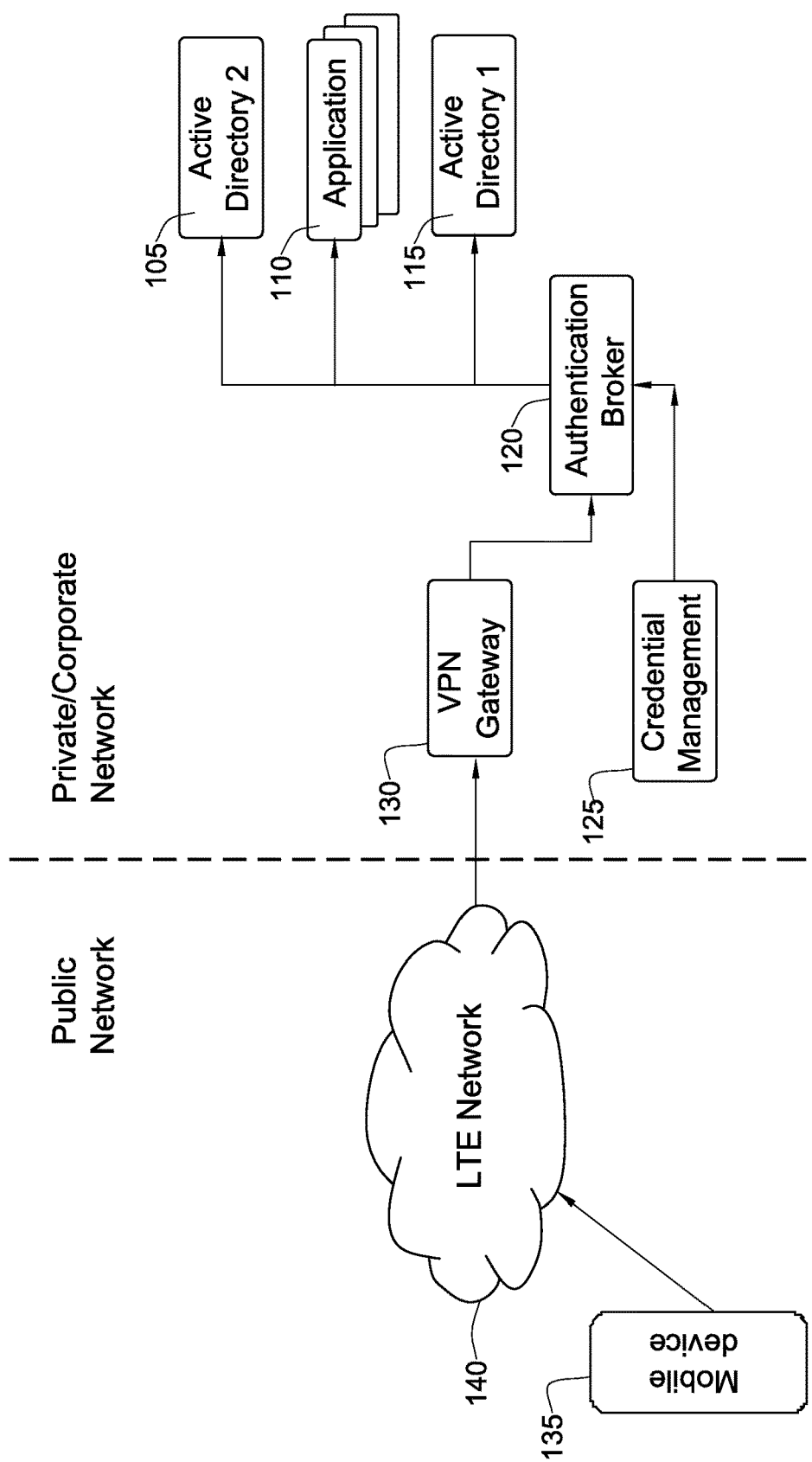
FIGS. 1-7 are diagrams and schematics illustrating certain embodiments of the present invention.

A system operative to unify multiple authentication schemes under a single entity, possibly with a central management system are now described e.g. with reference to FIG. 1. The same authentication system may be applied to the VPN Gateway and to the authentication system shown and described herein. Such a solution may create a unified authentication architecture that provides functional cooperation between the authentication mechanism (functionality) towards the VPN Gateway, and the applications within the organizational network.

A problem which may arise is how to use a centrally managed PKI to grant and control authentication to multiple application servers, possibly under disjointed authentication schemes and/or disconnected systems.

In situations where existing applications use a username/password based authentication or such an authentication scheme is accepted, at least the following functionalities may be provided:
  a. Change all applications to accept PKI authentication mechanism and install the CA certificate on the authenticated platform; and/or
  b. Accept the current situation where the user manually enters his username/password pair to authenticate; and/or
  c. Use an organizationally managed server e.g. a server managed by the organization associated with the private network of FIG. 1, to translate authentication used by the mobile device to the VPN Gateway to an applicative authentication i.e. an authentication process usable by the application to determine the identity or permissions of the user using the mobile device.

In situations where existing solution uses a PKI based solution or such solution is desired, at least the following functionalities may be provided:

a. Change the application to accept PKI authentication and install the CA certificate on the authenticated platform; and/or b. The user is required to use an external, often manual, authentication solution such as an RSA secure ID.

c. Use an organizationally managed server to translate authentication used by the mobile device to the VPN Gateway to an applicative authentication process typically usable by the application to determine the identity or permissions of the user using the mobile device.

Option a. in both situations above typically involves all applications being changed to incorporate a new authentication mechanism and thus may incur high integration costs on a plethora of platforms. Option b. in both situations above transfers the problem to the user and may therefore incur higher management costs.

Implementations for option c, according to various embodiments of the present invention, are now described.

According to certain embodiments, a server, also termed herein the "Authentication Broker" is provided that combines "single-sign on" functionality in conjunction with mobile authentication functionality. The mobile authentication functionality may be based on equipment/hardware authentication (such as but not limited to smart-card ID/key, SIM-card/IMEI) or on user authentication (such as username/password, manual key-insertion, any biometric authentication method e.g. fingerprint, face recognition, iris recognition or any other, either separately or in combination) or on a combined equipment and user authentication scheme. The term "Single sign on" may be interpreted as is known in the art, e.g. as per Wikipedia, or may refer to a property of access control of multiple related, but independent software systems. With this property a user logs in once and gains access to all systems without being prompted to log in again at each of them. According to a first embodiment of the invention, the Authentication Broker server comprises a central server that contains logic and details re the authentication of each application in the cellular network being served by the server.

Figure 3:
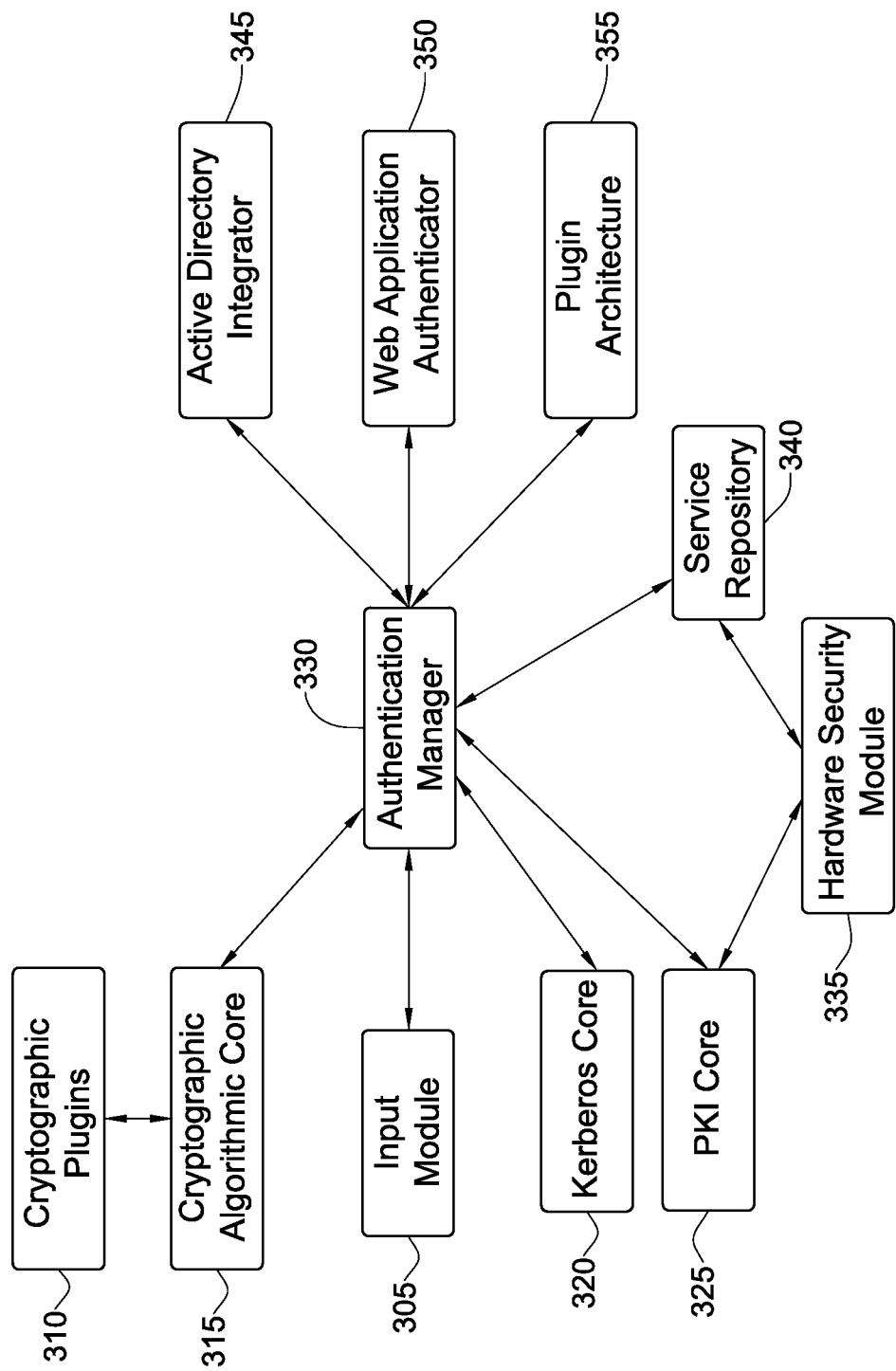
Figure 4:
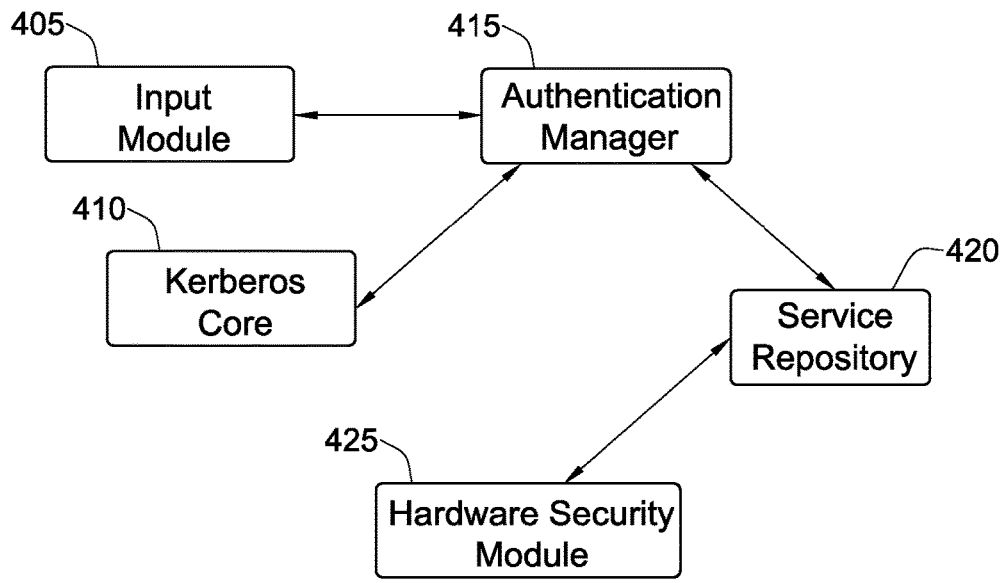

The system of FIG. 1 may include some or all of the following functional units, interacting suitably e.g. as shown:

Microsoft Active Directories 105, 115—(Sample authentication platform);

Applications 110 requiring authentication, such as but not limited to email server applications or web-application server applications;

A VPN Gateway 130;

A communication network 140 such as an LTE network or alternatively any wireless communication or cellular system such as $3^{rd}$ generation cellular or WiMAX;

A mobile device 135;

an Authentication Broker 120 e.g. as described below; and a management system 125 for the authentication broker, which is typically responsible for introducing records into the Secure Repository of the Authentication Broker e.g. as described in FIGS. 3 and 4 below.

Figure 6:
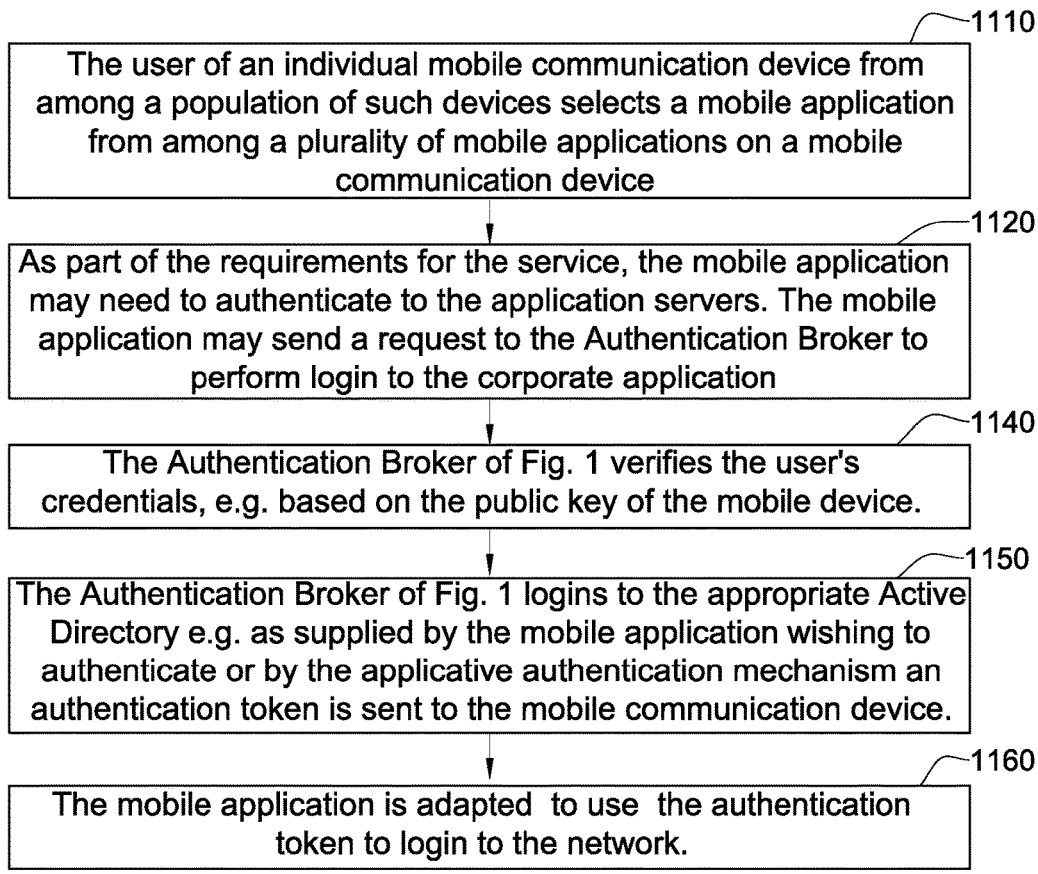

FIG. 6 is a simplified flowchart illustration of a usage flow including information flow in the system of FIG. 1, according to a first embodiment. The flow of FIG. 6 includes some or all of the following steps, suitably ordered e.g. as shown:

step 1110: The user of an individual mobile communication device from among a population of such devices (not shown), such as but not limited to $3^{rd}$ or $4^{th}$ generation cellular telephone, selects a mobile application such as email application or a proprietary organizational application from among a plurality of applications on a mobile communication device of which, for simplicity, 3 mobile applications are shown.

Step 1120: As part of the requirements for the service, the mobile application (i.e. the application that is running on the mobile device) needs to authenticate to the application servers. For example, a mobile application to view or edit emails is required to authenticate the user to the mail server before any mails can be sent or received. Typically, the mobile application sends a request to the Authentication Broker to perform login to the application Step 1140: The Authentication Broker of FIG. 1 verifies the user's credentials, e.g. by employing a standard authentication system such as Kerberos based on the public key of the mobile device or biometric mechanism or manual username and password insertion or any combination of them.

Step 1150: The Authentication Broker of FIG. 1 logins to the appropriate application server or authentication mechanism such as Active Directory. The specific Active-Directory is supplied or selected by the mobile application wishing to authenticate or by the applicative authentication mechanism (e.g. in cases where the application server handles its own authentication and does not employ an Active Directory server which is often the case in in-house developed custom applications); the Broker receives from the application server or authentication mechanism authentication token; the authentication token is sent to the mobile communication device. The content of the authentication token differs from application server to application server. The token may for example comprise a binary authentication token such as the Kerberos token.

Step 1160: The mobile application uses the authentication token to login to the application server.

Typically, the Authentication Broker of FIG. 1 contains modules that control the authentication process for the various applications. Authentication process control may for example comprise modification or insertion of authentication records and/or enforcement of policies. During integration of the network platform, the Credential Management system of FIG. 1 typically installs the information employed. Information may for example include both username and password, or private and or first public key for the user, as well as a second public key from the mobile device.

A particular advantage of having modules that control the authentication process which reside in the authentication broker 120, is that these processes can then be centrally managed (updated, replaced or configured e.g.) and the organization needs only maintain a single such entity.

According to certain embodiments, the public key from the device is used to protect a completely different key used to authenticate to the application server.

Optionally, when the user performs a login, typically, the mobile application sends a request (step 130) to the Authentication Broker. The public key of the mobile device typically signs the request. Once the Authentication Broker validates the request (step 140), the Authentication Broker 120 creates a new login request (step 150) to a target authentication system e.g. a target Active Directory such as Active Directory 105 or Active Directory 115 in FIG. 1.

Typically, when the method of FIG. 1 is employed, user credentials are stored on the central server and the credentials are kept in a readable form, e.g. in the clear, so that the Authentication Broker of FIG. 1 can authenticate for purposes of another mobile application as well. Implementation may for example be in accordance with FIGS. 2 and 6.

According to an alternative embodiment, e.g. as described below with reference to FIGS. 3 and 7, the authentication credentials are not stored in the clear, but keep each authentication record encrypted by the public key of the intended user of this record. The authentication record may for example include the user name and password/private key, the application and/or authentication service—such as Active Directory for which the record is intended. Typically, there is a single user: the owner of the mobile device for which the authentication record is encrypted. Usually this would be the same user (e.g. human) that the record indicates. For example, a mobile device owner might get access to the authentication record for her or his email account.

Figure 7:
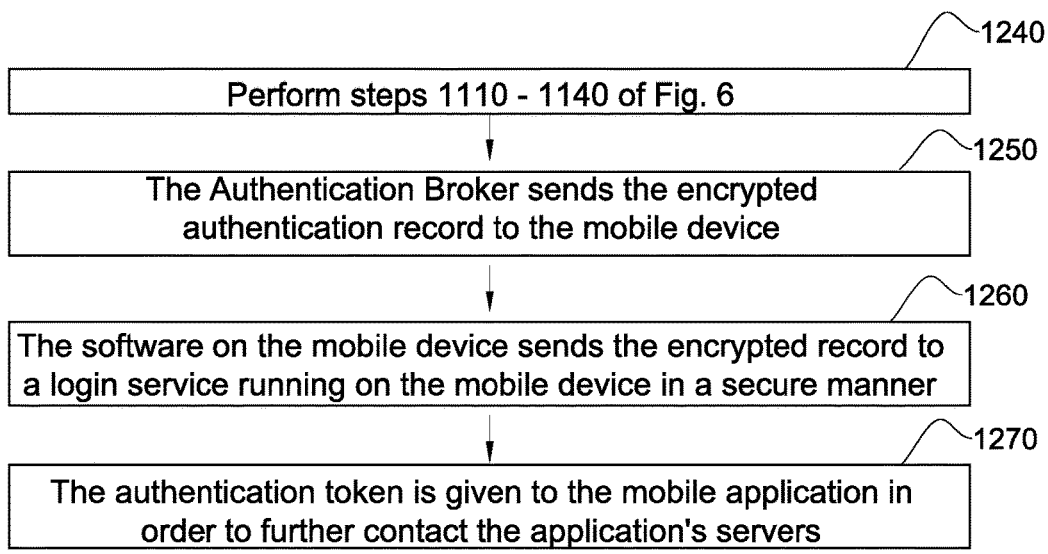

FIG. 7 is a simplified flowchart illustration of a usage flow including information flow in the system of FIG. 1, according to a second embodiment. The flow of FIG. 7 includes some or all of the following steps, suitably ordered e.g. as shown:

Step 1220: Providing to the authentication record encryption apparatus (device or software) the clear authentication records

1230: The authentication record encryption apparatus encrypts the clear authentication records; then the encrypted authentication records are loaded to the Authentication Broker memory Step 1240: perform steps 1110-1140 of FIG. 6

Step 1250: The Authentication Broker sends the encrypted authentication record to the mobile device Step 1260: The software on the mobile device sends the encrypted authentication record to a Service Dispatcher running on the mobile device in a secured manner e.g. utilizing software security such as TrustZone virtualization or the device hardware security part. The Service Dispatcher decrypts the encrypted authentication record.

Step 1270: The clear authentication record is used in order to further contact the application's servers. This can be optionally done for 2 alternatives:

Step 1280: If the authentication record is username and password then it is given to the mobile application and is used by it for authentication with the application server or its authentication mechanism Or alternatively (to step 1280)—step 1290: If the authentication record is PKI or similar authentication mean then the Service Dispatcher is used as virtual smart card and the mobile application can use it as a smart card for authentication and identity needs with the application server or its authentication mechanism.

Typically, when the mobile device is created, its public key is sent and stored on the Credential Management subsystem of FIG. 1. When the user is granted permissions to an application, the authentication information (such as but not limited to username/password or private key) may be encrypted by the user's public key and only the encrypted record may be sent to the Authentication Broker of FIG. 1.

In the embodiment of FIG. 7, there is typically absolutely no risk of a security breach even in the event that a hacker gets full access to the Authentication Broker of FIG. 1. Moreover, typically, in case a mobile device is lost or stolen, only the credentials for the user whose device was stolen are ever at risk. In addition, in the event that a mobile device is stolen, the Authentication Broker may be rapidly and easily updated re the stolen device identity, and may thereby prevent that stolen device from being served by the system.

It is appreciated that the embodiments of FIGS. 6 and 7 both typically allow easy central management of permissions, and revocations in case such is needed. Central management of permissions and revocation may be provided as is standard in authentication systems.

Figure 2:
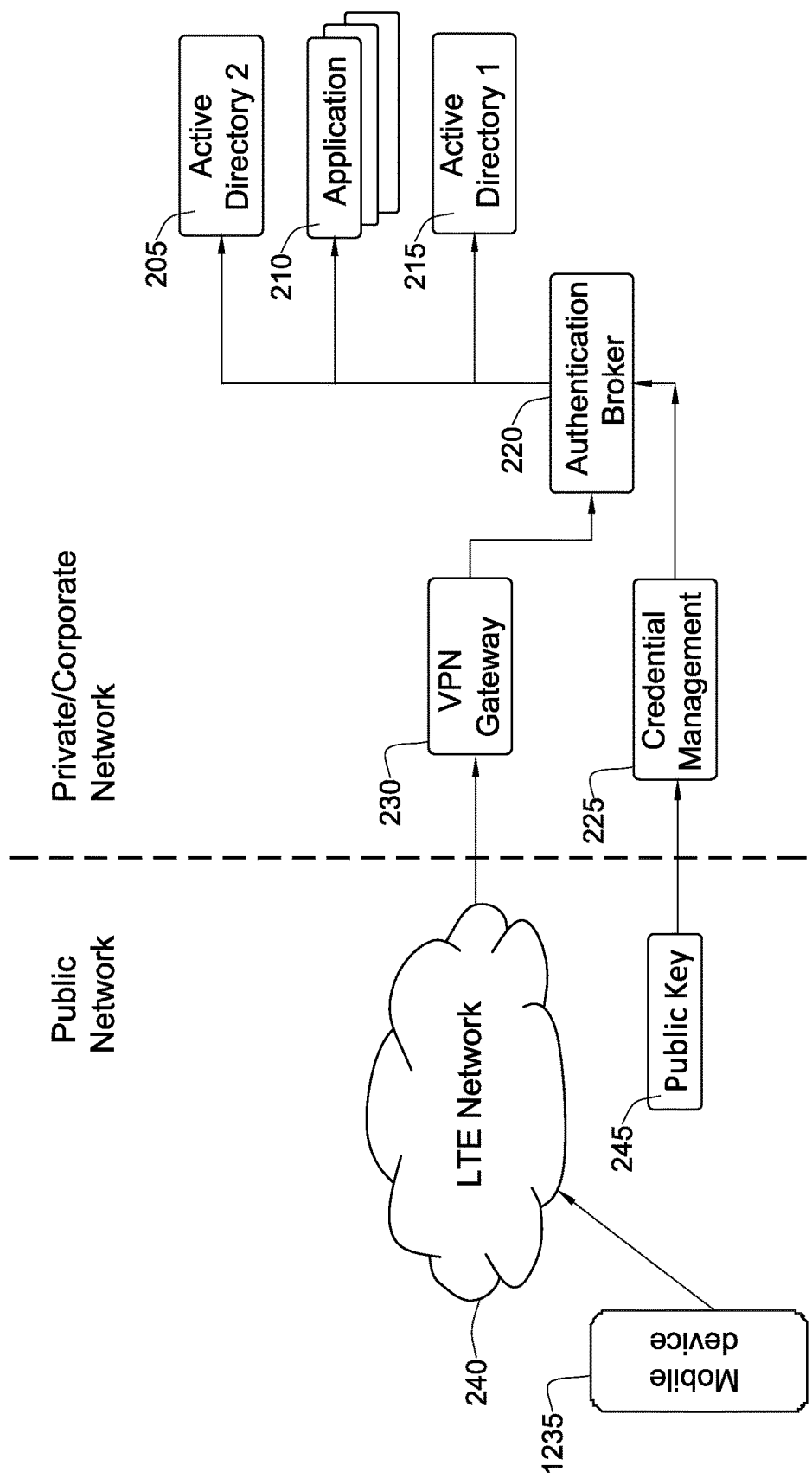

The processes of FIGS. 6 and 7 are typically repeated or done in parallel respectively for each application/authentication service from among a plurality of such e.g. for each of applications 110 in FIG. 1 or 210 in FIG. 2.

Typically, in the second embodiment, the public key from the mobile device is sent, ahead of its usage, to the credential management system. This embodiment typically employs a security domain which is obtainable by using standard means such as but not limited to ARM's TrustZone technology.

It is appreciated that in order to provide management of authentication for multiple applications e.g. applications 110 and 210 in FIGS. 1 and 2 respectively, multiple application and multiple disjoint active directory e.g. elements 105 and 115; and 205 and 215, are provided in FIGS. 1 and 2.

A secured part can optionally run on the mobile device and may include either an optional dedicated security processor (not shown) or may use a software emulation thereof using for example ARM trustzone architecture.

Active Directory is a commercial product which is just an example of suitable implementations of the relevant component. Any suitable Security Gateway may be used herein such as but not limited to the VPN Gateway specifically mentioned herein.

Figure 5:
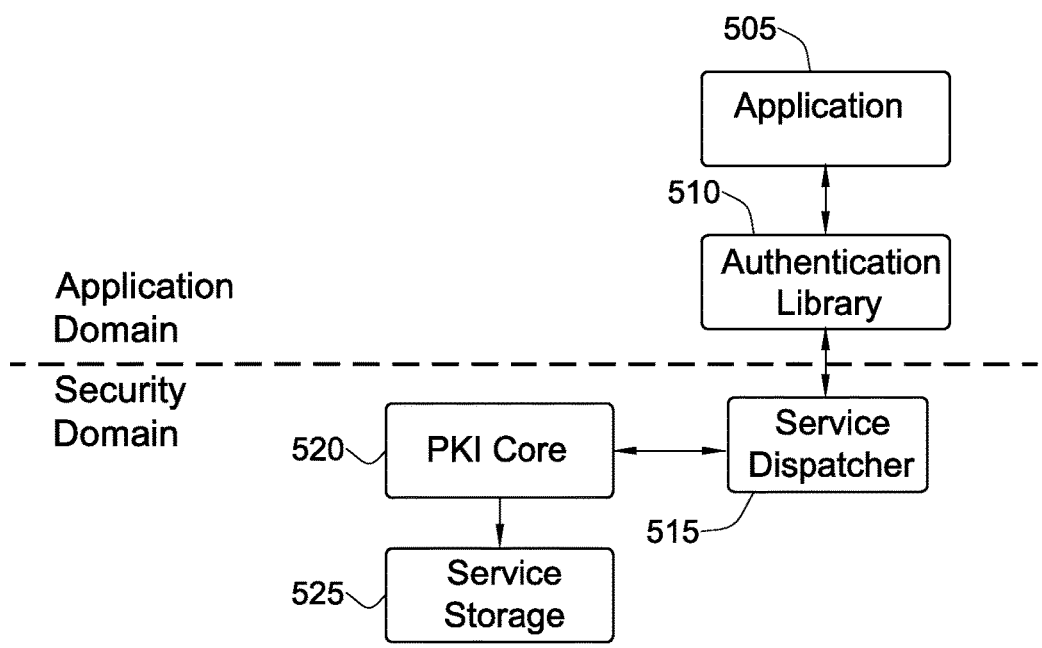

An example implementation of the mobile device and the interaction and structure described herein, particularly of the authentication broker (120 of FIG. 1 or 220 of FIG. 2) is now described in detail with reference to FIGS. 3-5.

A first embodiment of the Authentication Broker is now described in detail. In embodiment 1, e.g. as described in FIGS. 1 and 6, the Authentication Broker may serve as the focal point for all authentication requests. Each authentication request is sent to the Authentication Broker, which, in turn, performs authentication on the target machine and passes the authenticated token to the application running on the mobile device. Example schematics are shown in FIG. 3.

A suitable Interface towards the mobile device may be as follows:

The Authentication Broker exposes an applicative API towards the mobile device, e.g. by performing one or more of the following functionalities, suitably ordered e.g. as below:

i. Connection—The first step taken when the mobile application wishes to authenticate towards a service may be to connect to the Authentication Broker. The connection may be established by a secure connection mechanism such as SSL.

ii. Authentication—The mobile device may use its internal security hardware part or a software implementation thereof to perform a Kerberos login e.g. according to the specs specified in IETF's RFC 4120.

iii. Forwarding Requests—Once Kerberos authentication is performed, the authentication token may be used to authenticate a web-request. The request may include some or all of the following information:
  a. Authentication Token
  b. Application ID/name
  c. Target application
  d. Target authentication server iv. The result of this process differs according to the semantics of the authenticated service e.g. as per examples listed below. Typically, either a new, service specific, authentication token is returned, or a response stating that the rest of the traffic has to be transferred through the Authentication Broker. The latter case is often used in the (relatively rare) cases where the actual authenticated connection is a critical part of the authentication process.

Integration with Active Directory authentication may for example be as follows:

Active Directory on its own typically uses Kerberos, e.g. as per IETF's RFC 4120, as the basis of their authentication scheme typically under either of the following two flavors: Password based authentication (either uses PAP or CHAP) or a certificate-based authentication.

The authentication broker typically uses the Active-Directory integrator in order to contact the target Active Directory. According to the configuration of the authentication scheme with the Active Directory, the Authentication manager either uses the PKI core to provide a cryptographically secure signature towards the Active Directory or if password authentication is needed, contacts the secure repository to access the user's password.

Once authentication is complete, the Kerberos token is sent back towards the mobile device.

Integration with Web Applications authentication may be as follows:

It is appreciated that Web applications use a myriad of authentication schemes. Active Directory is commonly used, in which case, the solution above is used and no actual authentication is performed towards the Web-Application. Http based authentication schemes may be used, e.g. HTTP Basic authentication such as for example as described by tools.ietf.org's RFC 2617. Other web-applications use entirely custom authentication schemes; a suitable embodiment is described in detail below.

For standard adhering web-applications, the Web-Application authenticator performs the authentication and sends back the result to the mobile device. In the case of Plain HTTP authentication, the password is actually sent back to the mobile device to perform logins. This option may be supported but discouraged.

As for Integration with custom authentication, it is appreciated that myriad web applications use a custom authentication scheme that does not adhere to any authentication standard. In order to facilitate a single integration point, the Authentication Broker supports a plugin architecture that allows the addition of authentication modules towards specific applications. The authentication module has access to the credentials of users towards this specific server.

Integration with socket-based authentication may be provided. In particular, there is a special class of stateful authentication mechanisms where the actual logical connection, typically including the source IP and port of the originator of the authentication request, are part of the authenticated token. This typically does not permit the transfer of an authentication token. In order to support authentication in these cases, the Authentication Broker may reply to the device that "Forwarding" is required. The mobile device may then route all traffic destined to the application server through the Authentication Broker. The Authentication Broker may forward the content of the communication to the application server.

The software on the mobile device may be configured with the communication parameters of the Authentication Broker. Each mobile application uses this address and a supplied software library to connect to the Authentication Broker.

A second embodiment of the Authentication Broker is now described in detail. In embodiment 2, e.g. as described in FIGS. 2 and 7, the Authentication Broker serves as a secure repository for authentication credentials, while the actual authentication logic is mostly performed on the mobile device itself. Authentication requests are preceded by requests for credentials which are sent to the Authentication Broker. The Authentication Broker returns the encrypted authentication records to the mobile device for further processing.

In this embodiment, the user's authentication information is typically stored in an encrypted format optionally based on a PKI encryption scheme. The resulting "authentication record" is encrypted by the mobile device's public key so that only the mobile device's private key may decode it. An example of suitable schematics are shown in FIG. 4.

An example Interface towards mobile device may be as follows:

The Authentication Broker exposes an applicative API towards the mobile device, e.g. by performing one or more of the following functionalities, suitably ordered e.g. as below:

i. Connection—The first step taken when the mobile application wishes to authenticate towards a service may be to connect to the Authentication Broker. The connection may be established by a secure connection mechanism such as SSL.

ii. Authentication—The mobile device may use its internal security hardware part, or a software implementation thereof, to perform a Kerberos login e.g. according to the specs specified in IETF's RFC 4120.

iii. Credentials Requests—Once Kerberos authentication is performed; the authentication token may be used to authenticate a web-request. The request may include some or all of the following information:
   a. Authentication Token
   b. Application ID/name
   c. Target application
   d. Target authentication server iv. The Authentication Broker sends the encrypted authentication record towards the mobile device.

The authentication process itself is typically performed by the mobile device, typically by software on the mobile device. The relevant parts of the software architecture may for example be as shown in the diagram of FIG. 5.

When the application requests to perform authentication, the application typically requests this from the Authentication Library, which in turns contacts the Authentication Broker e.g. as described above. The Authentication Broker then typically sends the encrypted authentication record to the mobile device. The authentication record may be encrypted e.g. using a coordinated (between the mobile device and the Authentication Broker) encryption/authentication method such as, for example, PKI schemes or may be based on equipment/hardware encryption/authentication (such but not limited to as smart-card ID/key, SIM-card/IMEI) or on user authentication (such as but not limited to username/password, manual key-insertion, any biometric authentication method i.e. fingerprint, face recognition, iris recognition or any other, separately or in combination) or on a combined equipment and user authentication scheme. Encryption of the Authentication record prevents unauthorized use of the clear authentication record because only the destined mobile device can decrypt it.

Once an encrypted authentication record is retrieved, the record is sent to the Service Dispatcher, which decrypts the record, optionally using the PKI core, to access the (clear) private key of the device.

Next, if the target authentication is based on a clear password, this password is typically sent to the application. If, however, the application authentication is based on a public-key scheme or a hash-based authentication, the actual algorithm or process may be run in the Secured Domain and only the result sent back to the application. The Secured Domains may act as a partial "Trusted Processing Module" whose operation is defined by TrustedComputingGroup.org.

An advantage of certain embodiments of the invention is that the mobile device user need not remember a multiplicity of passwords for each of a multiplicity of applications (e.g. if each application button on a mobile device, such as Youtube, email, etc., were to demand its own user name and password upon being pressed); instead, a connection secured enough to transmit a password (e.g.) on is provided and a single sign-on can then be effected for the multiplicity of applications.

An advantage of certain embodiments of the invention is that although the communication network serving the mobile devices offering the applications may be wireless e.g. cellular, rather than wired e.g. Internet, and although wireless network are more sensitive to interception, nonetheless, security is achieved. Furthermore, if encryption is performed in advance of transmission such that information stored in the broker is stored pre-encrypted rather than in the clear, then the encryption can simultaneously achieve two goals, both security of the secured connection and preventing leakage of information in case the broker is hacked or otherwise compromised.

All terms herein may be construed either in accordance with any definition thereof appearing in the prior art literature or in accordance with the specification. Reference to specific formats or commercial products is merely exemplary. For example, the methods and systems shown and described herein may be applicable to formats which are not identical to but have relevant features in common with a specific format or commercial product.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment. Conversely, features of the invention, including method steps, which are described for brevity in the context of a single embodiment or in a certain order may be provided separately or in any suitable sub-combination or in a different order. For example, a system embodiment is intended to include a corresponding process embodiment. Also, each system embodiment is intended to include a server-centered "view" or client centered "view", or "view" from any other node of the system, of the entire functionality of the system , computer-readable medium, apparatus, including only those functionalities performed at that server or client or node.

"e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A mobile communication method including:
multiple login integration including secure integration of multiple login systems in mobile communication device applications; the integration including:
receiving, at an authentication broker, from an individual mobile application, a request to perform login to a corporate application,
using the authentication broker to verify user credentials; and using the authentication broker to send an encrypted authentication record to a login service running on the mobile device in a secure manner; and
in the mobile device, retrieving an encrypted authentication record sent by the authentication broker,
wherein the encrypted authentication record, once retrieved, is sent to a service dispatcher which decrypts the record to access a clear private key of the device,
wherein a basis for authentication is sent to the corporate application, and
wherein authentication is performed by software on the mobile device and wherein, when the application sends an authentication library a request to perform authentication, the Authentication Library responsively contacts the Authentication Broker which responsively sends the authentication record to the mobile device, encrypted using encryption coordinated between the mobile device and the Authentication Broker and wherein encryption of the Authentication record prevents unauthorized use of the authentication record because only the destined mobile device can decrypt the authentication record.

2. A method according to claim 1, wherein the individual mobile application is defined by a user of an individual mobile communication device.

3. A method according to claim 1, wherein the method is repeated for each application from among a plurality of such applications.

4. A method according to claim 3, wherein said authentication record comprises username and password.

5. A method according to claim 1, wherein the method is repeated for each authentication service from among a plurality of such authentication services.

6. A method according to claim 1, wherein the authentication broker uses an encryption method coordinated with the mobile device to ensure only a destined mobile device can decrypt an encrypted authentication record sent by the authentication broker.

7. A method according to claim 1, wherein architecture in the mobile device is configured to perform authentication, including: when a mobile communication device application requests to perform authentication, retrieving the encrypted authentication record sent by the authentication broker.

8. A method according to claim 7, wherein the encrypted authentication record, once retrieved, is sent to a service dispatcher which decrypts the record to access a clear private key of the device.

9. A method according to claim 8, wherein a basis for authentication is sent to the application.

10. A method according to claim 9, wherein said basis for authentication comprises at least one mobile equipment hardware authentication parameter.

11. A method according to claim 9, wherein, when the mobile device is created, a public key for the mobile device is sent to, and stored on, a Credential Management subsystem configured to introduce records into a Secure Repository of the Authentication Broker.

12. A method according to claim 11, wherein a central server is provided that defines logic of authentication of each application in the cellular network being served by the server.

13. A method according to claim 11, wherein, when the user is granted permissions to an application, the authentication information is encrypted by the user's public key and only the encrypted record is sent to the Authentication Broker.

14. A method according to claim 12, wherein authentication process control comprises insertion of authentication records.

15. A method according to claim 12, wherein authentication process control comprises enforcement of policies.

16. A method according to claim 11, wherein a server is provided which has "single-sign on" functionality in conjunction with mobile authentication functionality.

17. A method according to claim 11, wherein modules that control the authentication process reside in a central server, and are centrally managed.

18. A method according to claim 16, wherein at least one secure mobile device includes functionality which uses PKI functionality as a basis for network authentication.

19. A method according to claim 18, wherein said network authentication is compatible with smart-card authentication.

20. A method according to claim 11, further comprising apparatus for managing sign-on and applicative authentication that utilizes strong encryption available in a secure smart-phone.

21. A method according to claim 11, wherein the management of authentication for a plurality of applications in a manner is transparent to the user.

22. A method according to claim 10, wherein said mobile equipment hardware authentication parameter comprises an IMEI parameter.

23. A method according to claim 12, wherein authentication process control comprises modification of authentication records.

24. A method according to claim 17, wherein an authentication record is maintained including application service for which the record is intended.

25. A method according to claim 11, wherein a key from a mobile communication device is used to protect a completely different key used to authenticate the mobile communication device to an application server.

26. A method according to claim 10, wherein said mobile equipment hardware authentication parameter comprises a SIM-card parameter.

27. A mobile communication system including:
a processor and memory configured for multiple login integration including secure integration of multiple login systems in mobile communication device applications;
the integration including:
receiving, at an authentication broker, from an individual mobile application, a request to perform login to a corporate application,
using the authentication broker to verify user credentials; and using the authentication broker to send an encrypted authentication record to a login service running on the mobile device in a secure manner; and
in the mobile device, retrieving an encrypted authentication record sent by the authentication broker,
wherein the encrypted authentication record, once retrieved, is sent to a service dispatcher which decrypts the record to access a clear private key of the device,
wherein a basis for authentication is sent to the corporate application, and
wherein authentication is performed by software on the mobile device and wherein, when the application sends an authentication library a request to perform authentication, the Authentication Library responsively contacts the Authentication Broker which responsively sends the authentication record to the mobile device, encrypted using encryption coordinated between the mobile device and the Authentication Broker and wherein encryption of the Authentication record prevents unauthorized use of the authentication record because only the destined mobile device can decrypt the authentication record.

28. A computer program product, comprising a non-transitory tangible computer readable medium having computer readable program code embodied therein, said computer readable program code adapted to be executed to implement a mobile communication method including:
multiple login integration including secure integration of multiple login systems in mobile communication device applications; the integration including:
receiving, at an authentication broker, from an individual mobile application, a request to perform login to a corporate application,
using the authentication broker to verify user credentials; and using the authentication broker to send an encrypted authentication record to a login service running on the mobile device in a secure manner; and
in the mobile device, retrieving an encrypted authentication record sent by the authentication broker,
wherein the encrypted authentication record, once retrieved, is sent to a service dispatcher which decrypts the record to access a clear private key of the device,
wherein a basis for authentication is sent to the corporate application, and
wherein authentication is performed by software on the mobile device and wherein, when the application sends an authentication library a request to perform authentication, the Authentication Library responsively contacts the Authentication Broker which responsively sends the authentication record to the mobile device, encrypted using encryption coordinated between the mobile device and the Authentication Broker and wherein encryption of the Authentication record prevents unauthorized use of the authentication record because only the destined mobile device can decrypt the authentication record.

\* \* \* \* \*